United States Patent
Kim et al.

(10) Patent No.: US 11,522,239 B2
(45) Date of Patent: Dec. 6, 2022

(54) BATTERY MODULE, BATTERY PACK INCLUDING BATTERY MODULE, AND VEHICLE INCLUDING BATTERY PACK

(71) Applicant: LG Chem, Ltd., Seoul (KR)

(72) Inventors: Sang-Woo Kim, Daejeon (KR); Gyu-Jong Bae, Daejeon (KR); Yong-Seok Choi, Daejeon (KR)

(73) Assignee: LG Energy Solution, Ltd.

( * ) Notice: Subject to any disclaimer, the term of this patent is extended or adjusted under 35 U.S.C. 154(b) by 460 days.

(21) Appl. No.: 16/653,101

(22) Filed: Oct. 15, 2019

(65) Prior Publication Data
US 2020/0119416 A1 Apr. 16, 2020

(30) Foreign Application Priority Data
Oct. 15, 2018 (KR) .................. 10-2018-0122821

(51) Int. Cl.
| | | |
|---|---|---|
| *H01M 10/6556* | (2014.01) | |
| *H01M 10/625* | (2014.01) | |
| *B60L 50/64* | (2019.01) | |
| *H01M 10/613* | (2014.01) | |
| *H01M 50/20* | (2021.01) | |

(52) U.S. Cl.
CPC ......... *H01M 10/6556* (2015.04); *B60L 50/64* (2019.02); *H01M 10/613* (2015.04); *H01M 10/625* (2015.04); *H01M 50/20* (2021.01); *H01M 2220/20* (2013.01)

(58) Field of Classification Search
CPC ............................................ H01M 10/6556
See application file for complete search history.

(56) References Cited

U.S. PATENT DOCUMENTS

| 6,130,003 A * | 10/2000 | Etoh | B60R 16/04 |
|---|---|---|---|
| | | | 429/100 |
| 2013/0250512 A1* | 9/2013 | Ludwig | F28F 1/00 |
| | | | 361/689 |
| 2015/0079442 A1* | 3/2015 | Haussmann | H01M 10/625 |
| | | | 429/120 |
| 2015/0303537 A1 | 10/2015 | Jung et al. | |
| 2016/0268657 A1* | 9/2016 | Park | H01M 10/6554 |
| 2018/0115031 A1 | 4/2018 | Lee | |

FOREIGN PATENT DOCUMENTS

| JP | 2009135011 A | | 6/2009 | |
|---|---|---|---|---|
| KR | 20150076342 A | | 11/2015 | |
| KR | 20160046474 A | | 4/2016 | |
| KR | 20160065637 A | * | 6/2016 | .......... H01M 10/625 |
| KR | 20160065637 A | | 6/2016 | |
| KR | 20160109679 A | * | 9/2016 | ........ H01M 10/6554 |
| KR | 20170021122 A | * | 2/2017 | ........ H01M 10/6556 |

* cited by examiner

*Primary Examiner* — Eli S Mekhlin
(74) *Attorney, Agent, or Firm* — Lerner, David, Littenberg, Krumholz & Mentlik, LLP

(57) ABSTRACT

A battery module includes a plurality of battery cells; a module case configured to accommodate the plurality of battery cells; and heatsink provided on at least one side of the module case to cool the plurality of battery cells by means of a flow of a coolant. The heatsink may include a cooling channel having a sequential arrangement of branch locations along a direction of the flow of the coolant, defined from an inlet side to an outlet side of the heatsink, where the cooling channel diverges into a plurality of branches at each of the branch locations.

7 Claims, 7 Drawing Sheets

BATTERY MODULE, BATTERY PACK INCLUDING BATTERY MODULE, AND VEHICLE INCLUDING BATTERY PACK

CROSS-REFERENCE TO RELATED APPLICATIONS

The present application claims priority to Korean Patent Application No. 10-2018-0122821 filed on Oct. 15, 2018, the disclosure of which is hereby incorporated herein by reference.

TECHNICAL FIELD

The present disclosure relates to a battery module, a battery pack including the battery module, and a vehicle including the battery pack.

BACKGROUND ART

Secondary batteries which are highly applicable to various products and exhibit superior electrical properties such as high energy density, etc. are commonly used not only in portable devices but also in electric vehicles (EVs) or hybrid electric vehicles (HEVs) driven by electrical power sources. The secondary battery is drawing attention as a new energy source for being environmentally friendly and energy efficient in that the use of fossil fuels can be reduced greatly and no byproduct is generated during energy consumption.

Secondary batteries widely used at present include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.5V. Therefore, if a higher output voltage is required, a plurality of battery cells may be connected in series to construct a battery pack. In addition, depending on the charge/discharge capacity required for the battery pack, a plurality of battery cells may be connected in parallel to construct a battery pack. Thus, the number of battery cells included in the battery pack may be variously set according to the required output voltage or the demanded charge/discharge capacity.

Meanwhile, when a plurality of battery cells are connected in series or in parallel to construct a battery pack, it is common to construct a battery module having at least one battery cell first, and then construct a battery pack by using at least one battery module and adding other components.

A conventional battery module or pack includes a heatsink in which a coolant flows for cooling the battery cells. The conventional heatsink is typically mounted to one side of a module case or a pack case and has a cooling channel through which the coolant flows. The conventional cooling channel is generally connected between an inlet port (through which the coolant flows in) and an outlet port (through which the coolant flows out), and to the conventional cooling channel bends in a zigzag shape on one side of the module case or the pack case.

However, in the conventional battery module or pack, there is a great temperature difference between a portion where the cooling channel of the heatsink is located and a portion where the cooling channel of the heatsink is not located. In addition, in the conventional battery module or pack, the flow rate of the coolant is reduced at the portions where the cooling channel bends. Thus, as the amount of bending increases, the pressure drop between the inlet port and the outlet port increases, thereby hurting the cooling performance of the heatsink.

Thus, there is a demand for a method capable of providing a battery module, which may reduce the temperature non-uniformity caused by the heatsink and prevent deterioration of the cooling performance, as well as a battery pack including the battery module, and a vehicle including the battery pack.

DISCLOSURE

Technical Problem

The present disclosure is directed to providing a battery module which may reduce the temperature non-uniformity caused by the heatsink and prevent deterioration of the cooling performance, as well as a battery pack including the battery module, and a vehicle including the battery pack.

Technical Solution

In one aspect of the present disclosure, there is provided a battery module, comprising: a plurality of battery cells; a module case configured to accommodate the plurality of battery cells; and a heatsink provided on at least one side of the module case to cool the plurality of battery cells by means of a flow of a coolant, the heatsink including a cooling channel having a sequential arrangement of branch locations along a direction of the flow of the coolant, the flow of the coolant being defined from an inlet side to an outlet side of the heatsink. The cooling channel may diverge into a plurality of branches at east of the branch locations.

The heatsink may include a heatsink body configured to cover at least one side of the module case; an inlet port positioned on the inlet side of the heatsink body to supply the coolant to the cooling channel; and an outlet port positioned on the outlet side of the heatsink body, is the outlet side being opposite to the inlet side, to discharge the coolant from the cooling channel out of the heatsink body. The cooling channel may sequentially diverge in multiple stages from the inlet port.

The cooling channel may include an inlet channel configured to communicate with the inlet port; a diverging channel configured to communicate with the inlet channel and including the sequential arrangement of branch locations; a plurality of bridge channels configured to communicate with the diverging channel and each being spaced apart from one another by a predetermined distance along a width dimension of the heatsink body; and an outlet channel configured to connect the plurality of bridge channels to the outlet port.

The diverging channel may include a first diverging portion configured to communicate with the inlet channel and diverge into at least three first branches; a second diverging portion configured to communicate with the first diverging portion and diverge into at least three second branches; and a third diverging portion configured to communicate with the second diverging portion and diverge into at least two third branches.

The first diverging portion may include a main first branch configured to communicate with the second diverging portion; and side first branches configured to communicate with the plurality of bridge channels on opposing sides of the main first branch.

The second diverging portion may include a main second branch configured to connect the first diverging portion with the third diverging portion; and side second branches configured to communicate with the plurality of bridge channels on opposing sides of the main second branch.

The third diverging portion may communicate with the plurality of bridge channels.

Each of the plurality of bridge channels may have a cross-sectional area having a dimension based on a distance of the respective bridge channel from a center of the heatsink in the width dimension. The cross-sectional areas may increase as the distances from the center of the heatsink decrease.

In addition, the present disclosure provides a battery pack, comprising: at least one battery module according to the above embodiments; and a pack case configured to receive the at least one battery module.

Moreover, the present disclosure provides a vehicle, comprising at least one battery pack according to the above embodiment.

Advantageous Effects

According to various embodiments as above, it is possible to provide a battery module which may reduce the temperature non-uniformity caused by the heatsink and prevent deterioration of the cooling performance, as well as a battery pack including the battery module, and a vehicle including the battery pack.

DESCRIPTION OF DRAWINGS

The accompanying drawings illustrate a preferred embodiment of the present disclosure and, together with such disclosure, serve to provide further understanding of the technical features of the present invention. Thus, the present disclosure is not to be construed as being limited to the drawings.

BEST MODE

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease understanding of the present disclosure, the accompanying drawings are not drawn to real scale, but rather the dimensions of some components may be exaggerated.

Figure 1:
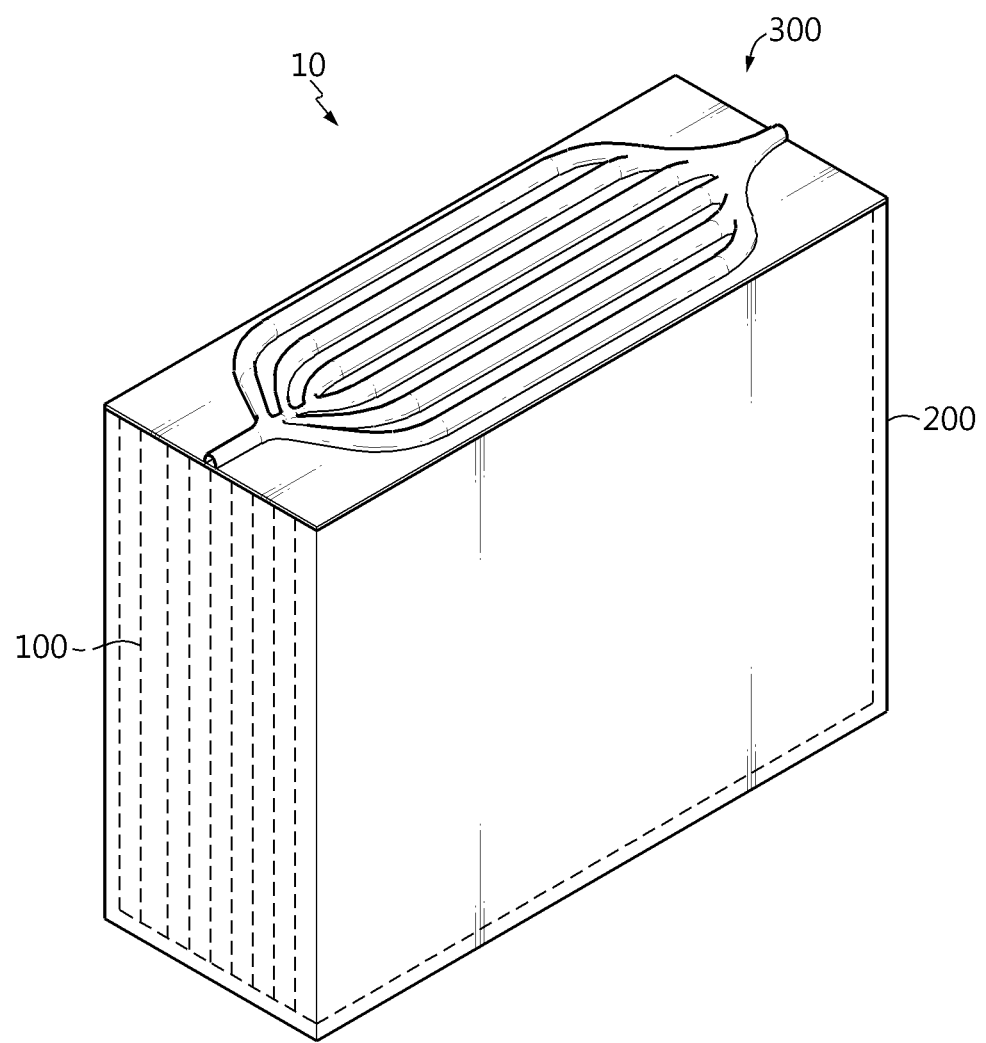
FIG. 1 is a perspective, diagrammatic view illustrating a battery module according to an embodiment of the present disclosure.
Figure 2:
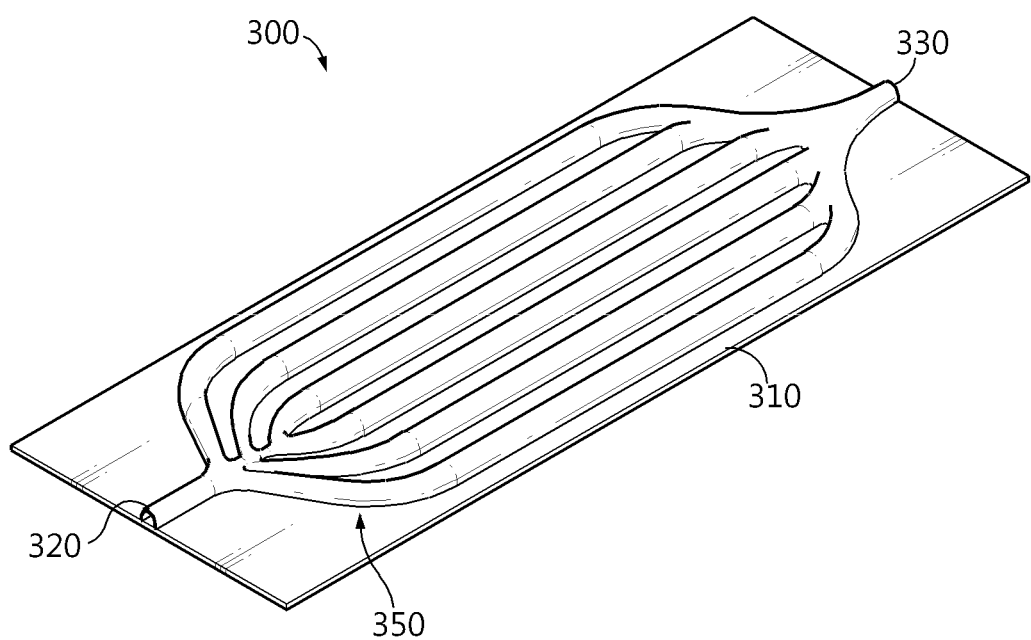
FIG. 2 is a perspective, diagrammatic view illustrating a heatsink of the battery module of FIG. 1.
Figure 3:
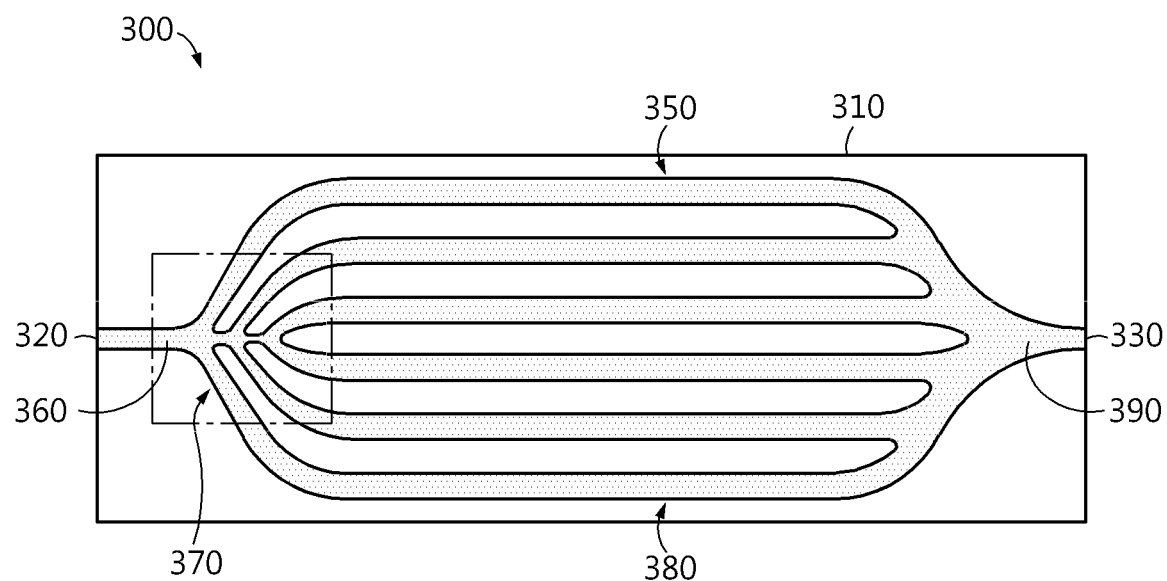
FIG. 3 is a plan view showing the heatsink of FIG. 2.
Figure 4:
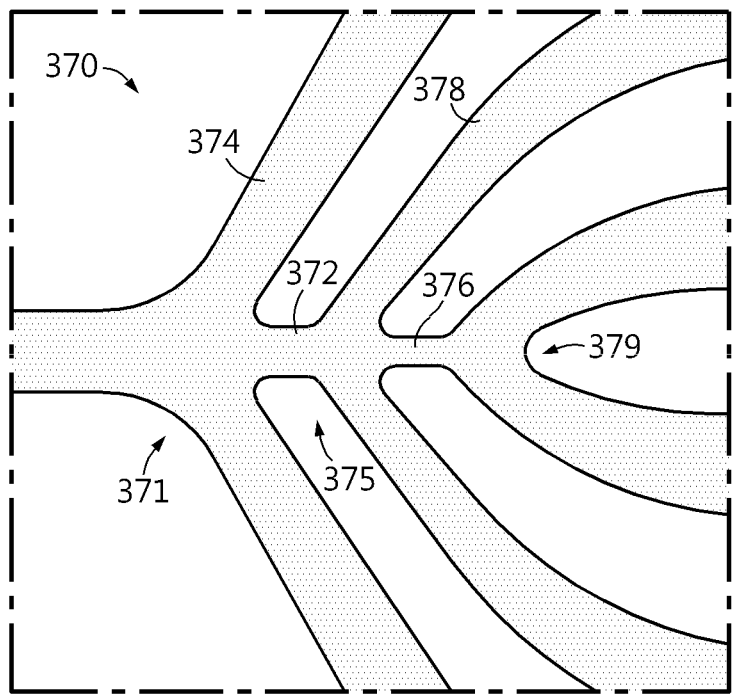
FIG. 4 is an enlarged view showing a main part of the heatsink of FIG. 3.

FIG. 1 is a perspective, diagrammatic view illustrating a battery module according to an embodiment of the present disclosure; FIG. 2 is a perspective, diagrammatic view illustrating a heatsink of the battery module of FIG. 1; FIG. 3 is a plan view showing the heatsink of FIG. 2; and FIG. 4 is an enlarged view showing a main part of the heatsink of FIG. 3.

Referring to FIGS. 1 to 4, a battery module 10 may include a battery cell 100, a module case 200, and a heatsink 300.

The battery cell 100 is a secondary battery and may be a pouch-type secondary battery, a rectangular secondary battery, or a cylindrical secondary battery. Hereinafter, in this embodiment, the battery cell 100 is described as a pouch-type secondary battery. A plurality of battery cells 100 may be provided. The plurality of battery cells 100 may be stacked on each other to be electrically connected to each other.

The module case 200 may accommodate the plurality of battery cells 100. To this end, the module case 200 may have an accommodation space capable of accommodating the plurality of battery cells 100.

The heatsink 300 may be provided to one side of the module case 200 to cool the plurality of battery cells 100 by means of the flow of a coolant. For example, the heatsink 300 may be provided to an upper side of the module case 200.

The heatsink 300 may include a heatsink body 310, an inlet port 320, an outlet port 330, and a cooling channel 350.

The heatsink body 310 may cover one side of the module case 200, for example the upper side of the module case 200 in this embodiment. The heatsink body 310 may be made of a metal material having high heat dissipation properties.

The inlet port 320 may be provided to one side of the heatsink body 310, for example to a front side of the heatsink body 310 in this embodiment. The inlet port 320 may be connected to an external cooling device to supply a coolant to the cooling channel 350 (explained later).

The outlet port 330 may be provided to the other side of the heatsink body 310, for example a rear side of the heatsink body 310 in this embodiment, which is opposite to the inlet port 320.

The outlet port 330 may discharge the coolant flowing in the cooling channel 350 (explained later) to the outside of the heatsink body 310. To this end, the outlet port 330 may be connected to the external cooling device to emit the coolant to the external cooling device.

The cooling channel 350 may be connected to the inlet port 310 and the outlet port 330. The cooling channel 350 may cool the battery cells 100 by means of the coolant flowing therethrough.

The cooling channel 350 may sequentially diverge from the inlet port 310 toward the outlet port 330. Specifically, the cooling channel 350 may be sequentially branched in multiple stages near the inlet port 310.

The cooling channel 350 may include an inlet channel 360, a diverging channel 370, a bridge channel 380, and an outlet channel 390.

The inlet channel 360 is formed to have a predetermined length along the forward/rearward dimension of the heatsink body 310 and may communicate with the inlet port 310.

The diverging channel 370 may be formed to communicate with the inlet channel 360 and may sequentially diverge the coolant in multiple stages along the forward/rearward dimension of the heatsink body 310.

The diverging channel 370 may include a first diverging portion 371, a second diverging portion 375, and a third diverging portion 379.

The first diverging portion 371 communicates with the inlet channel 360 and may diverge into at least three branches.

The first diverging portion 371 may include a main branch 372 and at least one side branch 374.

The main branch 372 communicates with the second diverging portion 375 (explained later) and may be provided to have a predetermined length along the forward/rearward dimension of the heatsink body 310.

The at least one side branch 374 may be provided as a pair of branches and may communicate with the plurality of bridge channels 380 (explained later) on opposing sides of the main branch 372 in the width dimension of the heatsink body 310—specifically, the bridge channels 380 located at the outermost sides along the width dimension of the heatsink body 310.

The second diverging portion 375 communicates with the first diverging portion 371 and may diverge into at least three branches.

The second diverging portion 375 may include a main branch 376 and at least one side branch 378.

The main branch 376 may connect the first diverging portion 371 with the third diverging portion 379 (explained later). The main branch 376 of the second diverging portion 375 may be aligned with the main branch 372 of the first diverging portion 371 along the forward/rearward dimension of the heatsink body 310.

The at least one side branch 378 may be provided as a pair of branches and may communicate with the plurality of bridge channels 380 (explained later) on opposing sides of the main branch 376 in the width dimension of the heatsink body 310—specifically, bridge channels 380 disposed inside the above-mentioned bridge channels 380 located at the outermost sides along the width dimension of the heatsink body 310.

The third diverging portion 379 communicates with the second diverging portion 375 and may diverge into at least two branches. The third diverging portion 379 may communicate with the plurality of bridge channels 380 (explained later)—specifically, the bridge channels 380 at a central portion in the width dimension of the heatsink body 310.

A plurality of bridge channels 380 may be provided. The plurality of bridge channels 380 communicate with the diverging channel 370 and may be spaced apart from each other by a predetermined distance along the width dimension of the heatsink body 310.

The outlet channel 390 connects the plurality of bridge channels 380 with the outlet port 330 and may be provided on the other side of the heatsink body 310—specifically, a rear side of the heatsink body 310 in this embodiment.

Hereinafter, the coolant flow of the heatsink 300 according to this embodiment will be described in more detail.

Figure 5:
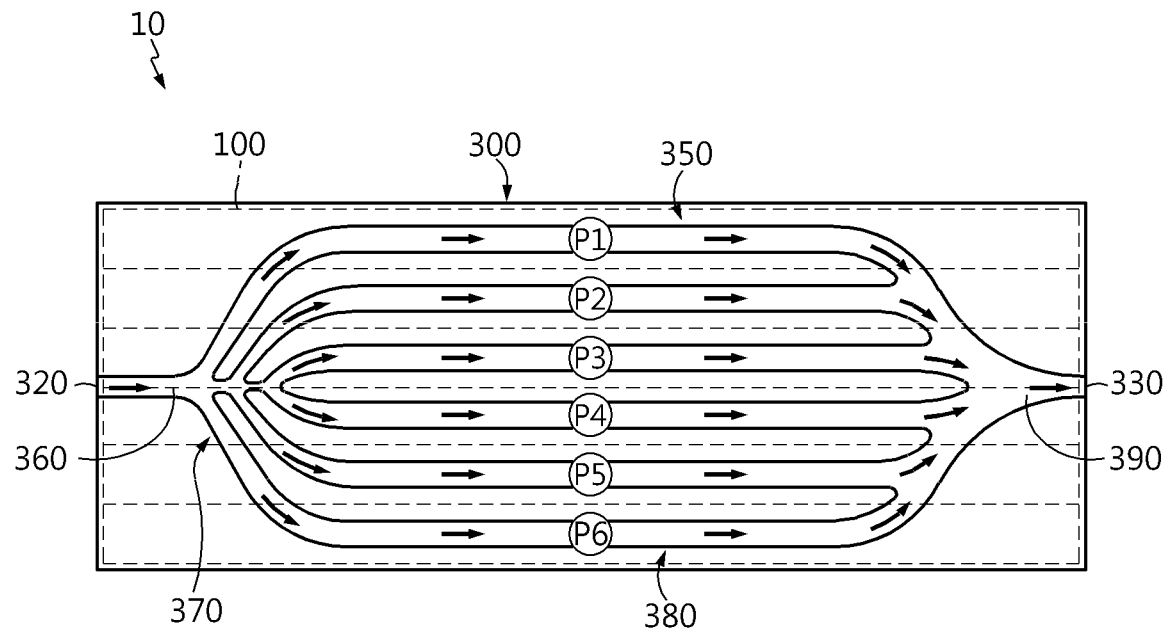
FIGS. 5 and 6 are diagrams for illustrating the flow of a coolant in the heatsink of FIG. 2.
Figure 6:
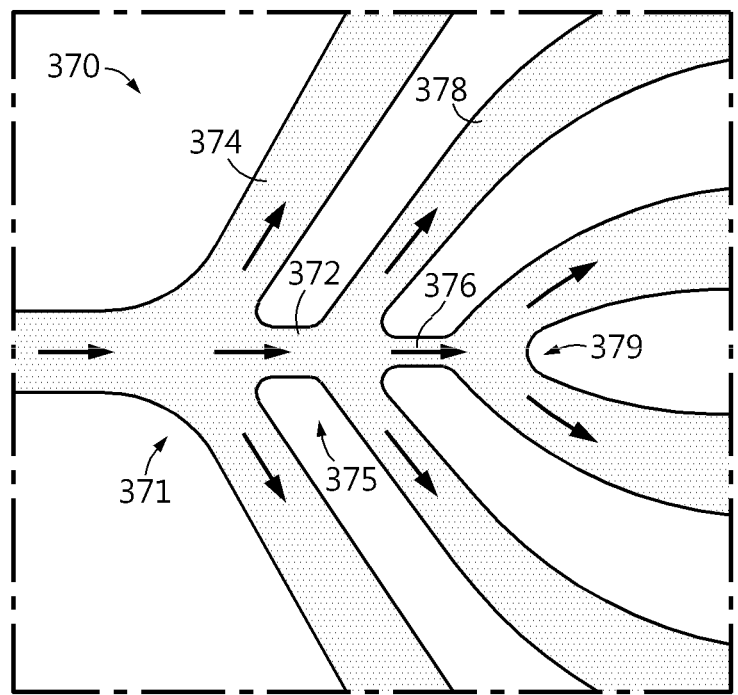
Figure 7:
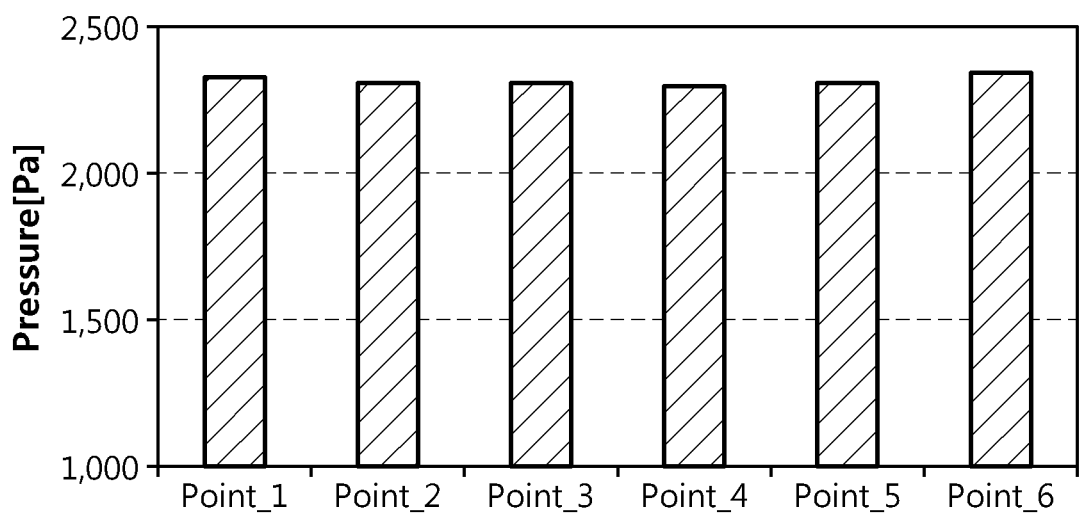
FIG. 7 is a diagram for illustrating a pressure distribution when the coolant flows in the heatsink of FIG. 5.

FIGS. 5 and 6 are diagrams illustrating the flow of a coolant in the heatsink of FIG. 2, and FIG. 7 is a diagram illustrating a pressure distribution when the coolant flows in the heatsink of FIG. 5.

Referring to FIGS. 5 to 7, when the battery cells 100 of the battery module 10 are cooled, the heatsink 300 may cool the battery cells 100 by means of the flow of the coolant.

Specifically, the coolant may flow in from the inlet port 320 of the heatsink 300. After that, the coolant may pass through the inlet channel 360 of the cooling channel 350 and then diverge in multiple stages through the diverging channel 370.

The coolant may firstly diverge at the first diverging portion 371 of the diverging channel 370. Specifically, first, the coolant may diverge into the main diverging portion 372 and the pair of side diverging portions 374 of the first diverging portion 371. More specifically, the coolant diverging into the main diverging portion 372 of the first diverging portion 371 may flow toward the second diverging portion 375, and the coolant diverging into the pair of side diverging portions 374 of the first diverging portion 371 may flow toward the bridge channels 380 disposed at the outermost sides along the width dimension of the heatsink body 310.

The coolant flowing toward the second diverging portion 375 may diverge again at the second diverging portion 375. Specifically, the coolant may diverge into the main diverging portion 376 and the pair of side diverging portions 378 of the second diverging portion 375. More specifically, the coolant diverging into the main diverging portion 376 of the second diverging portion 375 may flow toward the third diverging portion 379, and the coolant diverging into the pair of side diverging portions 376 of the second diverging portion 375 may flow toward the bridge channels 380 disposed inside the bridge channels 380 disposed at the outermost sides along the width dimension of the heatsink body 310.

The coolant flowing toward the third diverging portion 379 may diverge into two directions to flow toward the bridge channels 380 at the center portion of the heatsink body 310 along the width dimension.

After that, the coolant flowing through the plurality of bridge channels 380 may be collected at the outlet channel 390 and discharged out of the heatsink 300 through the outlet port 330.

The heatsink 300 according to this embodiment may distribute the coolant so as to evenly flow to the plurality of bridge channels 380 between the inlet port 320 and the outlet port 330 by means of the sequential multi-stage diverging structure.

In this embodiment, since the plurality of bridge channels 380 are evenly arranged at one side of the plurality of battery cells 100, the temperature non-uniformity of the battery cells 100 may be significantly reduced.

Moreover, in this embodiment, as shown in FIGS. 5 and 7, by means of the sequential multi-stage diverging structure, pressure values P1 to P6 of the bridge channels 380 may be kept relatively equal.

Accordingly, in this embodiment, the pressure drop between the inlet port 310 and the outlet port 330 of the heatsink 300 may be minimized, thereby preventing the cooling performance of the heatsink 300 from deteriorating, and thus significantly improving the cooling efficiency of the heatsink 300.

Figure 8:
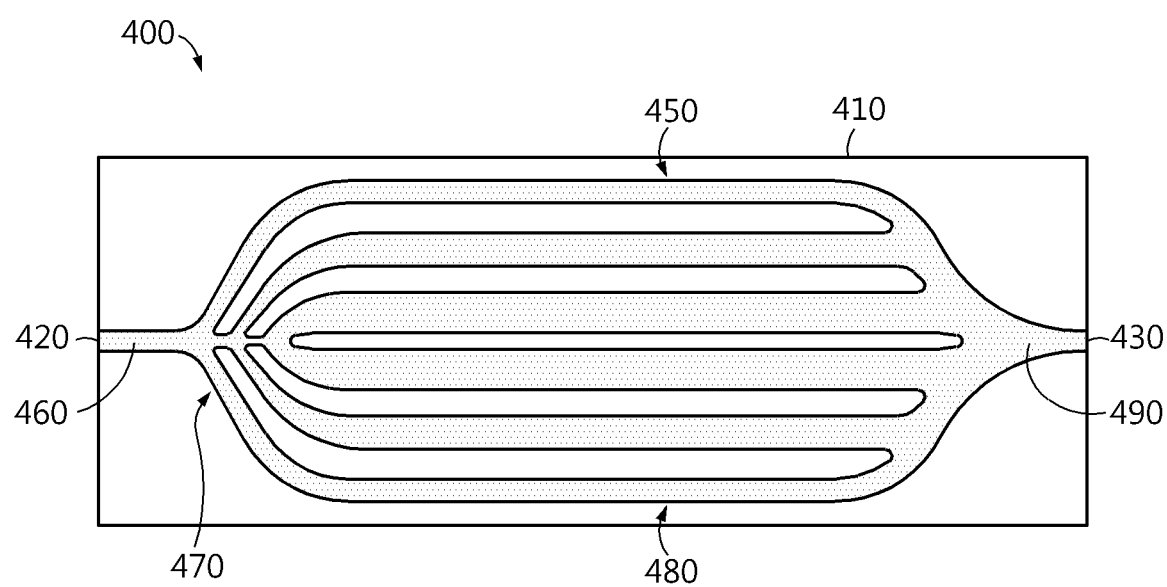
FIG. 8 is a plan view illustrating a heatsink of the battery module of FIG. 1 according to another embodiment.

FIG. 8 is a plan view illustrating a heatsink of the battery module of FIG. 1 according to another embodiment.

Since a heatsink 400 according to this embodiment is similar to the heatsink 300 of the former embodiment, features substantially identical or similar to those of the former embodiment will not be described in detail, whereas features different from the former embodiment will be described in detail.

Referring to FIG. 8, the heatsink 400 may include a heatsink body 410, an inlet port 420, an outlet port 430, and a cooling channel 450.

The heatsink body 410, the inlet port 420, and the outlet port 430 are substantially identical or similar to those of the former embodiment and thus will not be described in detail.

The cooling channel 450 may include an inlet channel 360, a diverging channel 470, a bridge channel 480, and an outlet channel 490.

The inlet channel 360, the diverging channel 470 and the outlet channel 490 are substantially identical or similar to those of the former embodiment and thus will not be described in detail.

A plurality of bridge channels 480 may be provided. The width of each of the plurality of bridge channels 480 may gradually increase from the outer sides of the heatsink body 410 in the width dimension toward the center, as shown in FIG. 8.

In this embodiment, since the width of each of the plurality of bridge channels 480 increases toward the center of the heatsink body 410, it is possible to further improve the cooling efficiency of the battery cells at the central portion, which generate heat at a relatively higher temperature than the battery cells located towards at the outermost sides.

Figure 9:
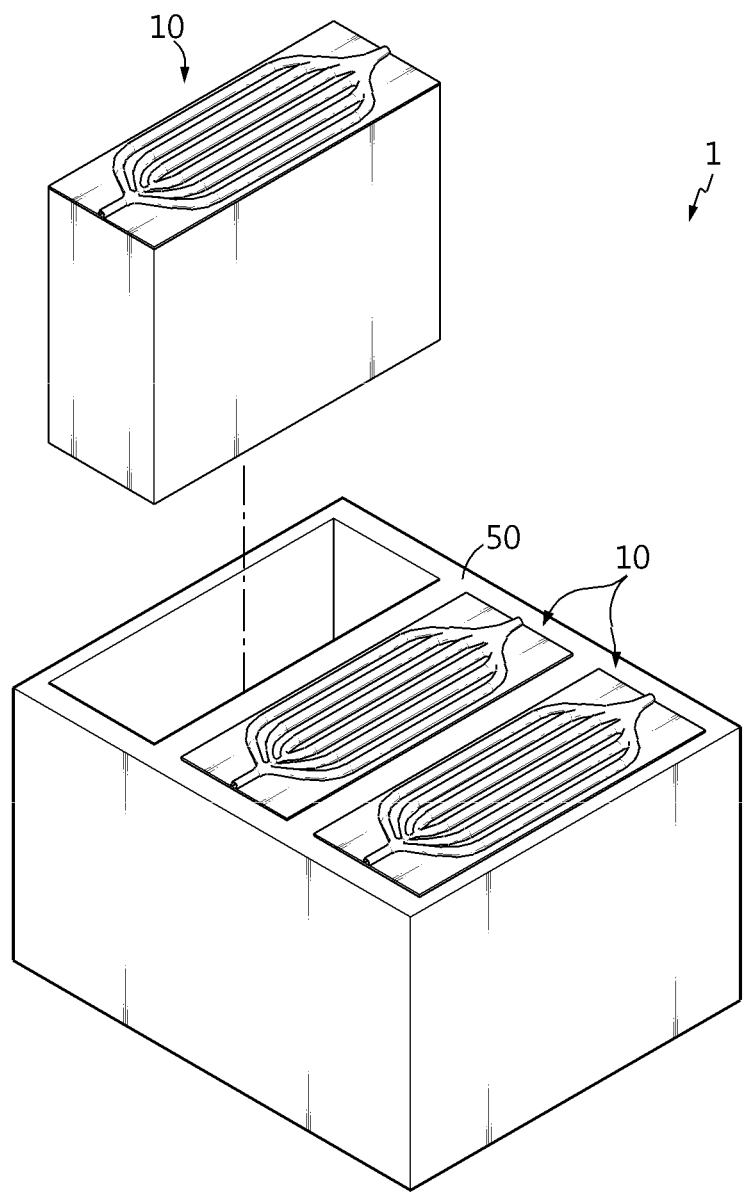
FIG. 9 is a perspective, diagrammatic view illustrating the construction of a battery pack according to an embodiment of the present disclosure.
Figure 10:
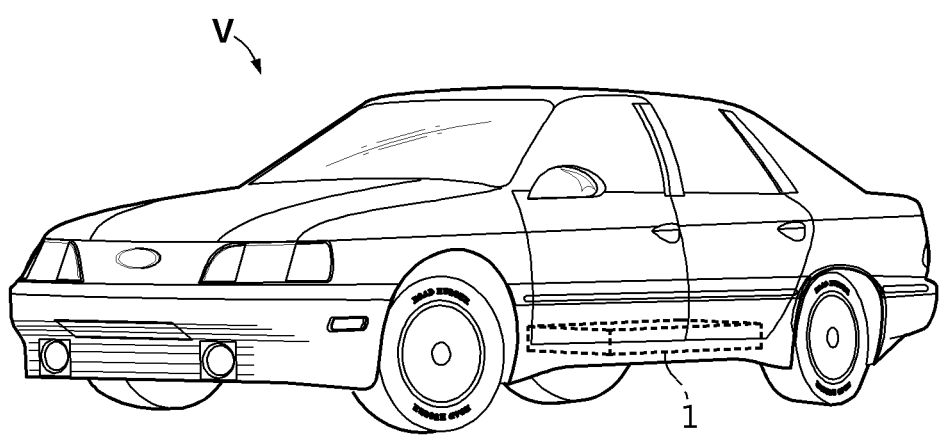
FIG. 10 is a perspective, diagrammatic view illustrating a vehicle according to an embodiment of the present disclosure.

FIG. 9 is a perspective, diagrammatic view illustrating a battery pack according to an embodiment of the present disclosure, and FIG. 10 is a perspective, diagrammatic view illustrating a vehicle according to an embodiment of the present disclosure.

Referring to FIGS. 9 and 10, a battery pack 1 may include at least one battery module 10 according to the former embodiment, as well as a pack case 50 for packaging the at least one battery module 10.

The battery pack 1 may be provided in a vehicle V as a fuel source of the vehicle V. As an example, the battery pack 1 may be provided in a vehicle V such as an electric vehicle, a hybrid vehicle, or various other-type vehicles capable of using the battery pack 1 as a fuel source.

In addition, the battery pack 1 may be provided in other devices, instruments, or facilities, such as an energy storage system using a secondary battery, in addition to the vehicle V.

As described above, the battery pack 1 of this embodiment, as well as devices, instruments, or facilities (such as a vehicle V), which have the battery pack 1, include the battery module 10, 20 as described above. Thus it is possible to implement a battery pack 1 having all the advantages of the battery module 10, 20 described above, as well as devices, instruments, facilities, or the like (such as a vehicle V), which have the battery pack 1.

According to various embodiments as above, it is possible to provide a battery module 10, which may improve the temperature non-uniformity caused by the heatsink 300, 400 and prevent deterioration of the cooling performance, as well as a battery pack 1 including the battery module 10, and a vehicle V including the battery pack 1.

While the embodiments of the present disclosure have been shown and described, it should be understood that the present disclosure is not limited to the specific embodiments described, and that various changes and modifications can be made within the scope of the present disclosure by those skilled in the art, and these modifications should not be understood solely from the technical ideas and views of the present disclosure.

REFERENCE SIGN

V: vehicle
1: battery pack
10: battery module
50: pack case
100: battery cell
200: module case
300: heatsink
310: heatsink body
320: inlet port
330: outlet port
350: cooling channel
360: inlet channel
370: diverging channel
371: first diverging portion
372: main branch
374: side branch
375: second diverging portion
376: main branch
378: side branch
379: third diverging portion
380: bridge channel
390: outlet channel
400: heatsink
410: heatsink body
420: inlet port
430: outlet port
450: cooling channel
460: inlet channel
470: diverging channel
480: bridge channel
490: outlet channel

What is claimed is:

1. A battery module, comprising:
a plurality of battery cells;
a module case configured to accommodate the plurality of battery cells; and
a heatsink provided on at least one side of the module case to cool the plurality of battery cells by means of a flow of a coolant, the heatsink including a cooling channel having a sequential arrangement of branch locations along a direction of the flow of the coolant, defined from an inlet side to an outlet side of the heatsink, wherein the cooling channel diverges into a plurality of branches at each of the branch locations,
wherein the heatsink includes:
a heatsink body configured to cover the at least one side of the module case;
an inlet port positioned on the inlet side of the heatsink body to supply the coolant to the cooling channel; and
an outlet port positioned on the outlet side of the heatsink body, the outlet side being opposite to the inlet side, to discharge the coolant from the cooling channel out of the heatsink body,
wherein the cooling channel includes:
an inlet channel configured to communicate with the inlet port;
a diverging channel configured to communicate with the inlet channel, the diverging channel including the sequential arrangement of branch locations;
a plurality of bridge channels configured to communicate with the diverging channel, each of the plurality of bridge channel being spaced apart from one another by a predetermined distance along a width dimension of the heatsink body; and
an outlet channel configured to connect the plurality of bridge channels to the outlet port,
wherein each of the plurality of bridge channels has a cross-sectional area, each cross-sectional area having a dimension based on a distance of the respective bridge channel from a center of the heatsink in the width dimension, such that the cross-sectional areas increase as the distances from the center of the heatsink decrease.

2. The battery module according to claim 1, wherein the diverging channel includes:
   a first diverging portion configured to communicate with the inlet channel and diverge into at least three first branches;
   a second diverging portion configured to communicate with the first diverging portion and diverge into at least three second branches; and
   a third diverging portion configured to communicate with the second diverging portion and diverge into at least two third branches.

3. The battery module according to claim 2, wherein the at least three first branches of the first diverging portion include:
   a main first branch configured to communicate with the second diverging portion; and
   side first branches configured to communicate with the plurality of bridge channels on opposing sides of the main first branch.

4. The battery module according to claim 2, wherein the at least three second branches of the second diverging portion includes:
   a main second branch configured to connect the first diverging portion with the third diverging portion; and
   side second branches configured to communicate with the plurality of bridge channels on opposing sides of the main second branch.

5. The battery module according to claim 2,
   wherein the at least two third branches of the third diverging portion communicate with the plurality of bridge channels.

6. A battery pack, comprising:
   at least one battery module according to claim 1; and
   a pack case configured to receive the at least one battery module.

7. A vehicle, comprising:
   at least one battery pack according to claim 6.

* * * * *